(12) United States Patent
Gong (10) Patent No.: US 6,882,901 B2
(45) Date of Patent: Apr. 19, 2005

(54) ULTRA-PRECISION ROBOTIC SYSTEM

(76) Inventor: Shao-Wei Gong, 881 Spring Valley Dr., Cookeville, TN (US) 38501

( * ) Notice: Subject to any disclaimer, the term of this patent is extended or adjusted under 35 U.S.C. 154(b) by 68 days.

(21) Appl. No.: 10/268,282

(22) Filed: Oct. 10, 2002

(65) Prior Publication Data

US 2004/0073335 A1 Apr. 15, 2004

(51) Int. Cl.$^7$ .............................................. G06F 19/00
(52) U.S. Cl. ....................... 700/245; 700/246; 700/254; 700/262; 318/135; 318/687; 355/53; 356/508; 356/450; 356/498; 438/108; 438/612; 438/617
(58) Field of Search ............................... 700/245, 246, 700/254, 262; 318/135, 687; 438/108, 612, 617; 355/53; 356/508, 498, 450

(56) References Cited

U.S. PATENT DOCUMENTS

| | | | | |
|---|---|---|---|---|
| 6,144,118 A | * | 11/2000 | Cahill et al. | .................. 310/12 |
| 6,327,038 B1 | * | 12/2001 | Maxey | ........................ 356/508 |
| 6,730,541 B1 | * | 5/2004 | Heinen et al. | .............. 438/108 |
| 6,744,228 B1 | * | 6/2004 | Cahill et al. | ................. 318/135 |
| 2001/0044197 A1 | * | 11/2001 | Heinen et al. | .............. 438/612 |

OTHER PUBLICATIONS

Yamamoto et al., Task analysis of ultra–precision assembly process for autonomation of human skills, 2001, IEEE, pp. 2093–2098.*

* cited by examiner

Primary Examiner—Thomas G. Black
Assistant Examiner—Marc McDieunel (57) ABSTRACT

A multiple degree-of-freedom ultra-precision (DOF) robotic system yielding either rigid body guidance or large deformation analysis (LDRS, i.e. semi-flexible and flexible robotics) is developed based on the technology of integrating a multiple DOF ultra-precision shadow robotic measurement system with a multiple DOF robot for form a closed-loop linkage chain to establish a corresponding closed-loop feedback control of end-effecter of said robotic system without the use and limitation of any target or artificial marker in work-cell as the reference. In this way, the major degrading problems that greatly drag down the positioning accuracy of a robot have been fairly resolved. The embodiment conducts the details of the development of such a multiple DOF ultra-precision robotic system for the general applications in precision engineering.

7 Claims, 6 Drawing Sheets

ULTRA-PRECISION ROBOTIC SYSTEM

BACKGROUND OF THE INVENTION

This invention is related to a robotic system with rigid body guidance or a robotic system with large deformation analysis (LDRS, i.e. semi-flexible and flexible robotic system) in robotics. A robotic system possesses the advanced properties to be one of the most important equipment in modem precision engineering. However, there are some serious technical barriers which have greatly dragged down the qualification of positioning accuracy of the technology for its general applications in precision engineering. The following degrading influences are considered as the major problems to cause such barriers:

The influence of tolerance and clearance;

The influence of the deformation of elements under load;

The influence of the change of load;

The influence of the wear of kinematic pair;

The influence of the ambient conditions, especially, the temperature; and

The influence of some associated problems with the gap of clearance and wear (i.e. backlash, contamination, and the thin film of lubrication, etc.).

If these problems can be resolved, it will be easy for a robotic system to achieve the precise positioning accuracy or even ultra-precision positioning accuracy, and to claim its important role in modem precision engineering. The difficulty is that these degrading factors are inevitable with current understanding of the technology of robotics since they are associated with the nature of design, manufacturing, assembly, and application of a robotic system. Here, the positioning accuracy refers to the frame origin position and the frame orientation of the end-effecter of robot. As a result, to date, the positioning accuracy of a robot is relatively low. For example, in the development of a precise robotic computed tomography inspection system, a robotic system with the positioning accuracy in two-digital micrometer-level {0.001 in (0.025 mm), 5 arc-second} is urgently needed; however, on today's robotic market, such a precise robot is still unavailable.

If a robotic system yielding rigid body analysis is not qualified to have precision positioning accuracy, then a robotic system yielding large deformation analysis (LDRS, i.e. the semi-flexible and the flexible robotic systems) is almost impossible to play a role in precision engineering. With a LDRS, all the above degrading problems exist; moreover, the problem of deformation becomes extremely serious. The uncertainties of nonlinear correlations of deformation make the LDRS too difficult to be controlled. By now, the technology of LDRS is still at its very early developing stage. Although a LDRS can have higher payload/weight ratio and better dynamic properties for limber motion, which are considered as the future direction of development of modem robotics, it is noted that no 6-D flexible robotic system has been developed yet in real application with the acceptable accuracy.

With investigation, it is found that many valuable efforts with academic researches and industrial practices have been done for the development of both the rigid-body robotic system and the LDRS. For simplification, the prior efforts can be classified into two different categories of control technology. The first is the category of direct control theory. For example, the robotic positioning control with finite element analysis, and the robotic positioning control based on real-time monitoring with embodied sensor on the elements to detect the deformation of linkage chain are the major efforts with this category. The direct control technology focuses on the understanding of the properties and characteristics of elements of the researched robotic system itself to explore the effective control. As above-mentioned, a robotic system with direct control suffers the influences of degrading factors, and it is difficult to achieve ultra-precision positioning accuracy.

The other can be classified as the category of indirect control theory. This technology tries to develop the effective control with the help of the target(s) or artificial marker(s) in the work-cell and some accessories that are not necessarily defined as part of the studied robotic system. The oldest indirect control of the robotic system is the tactile sensor system, which uses contact sensors to detect the position of the robotic system with the target(s) in work-cell as the reference to form closed-loop feedback control for positioning control. Currently, the most popular indirect control theory may be the visual servoing technology for robotic system control. Since this technology can form a non-contact closed-loop feedback control, it is getting its dominating position in the development of robotic system control. Generally, the visual servoing technology for robotic system control can be simplified in three different ways. The first is the on-body method. With this method, the visual sensor is mounted on the body of the robotic system to gather feedback control data. The second is the on-work-cell method. With this method, the visual sensor is mounted somewhere in the work cell to monitor the robotic system for gathering feedback-control data. The third is the combination of the above two ways. Currently, visual servoing technology of robotics is considered the main stream of robotic motion control. However, so far, visual servoing technology used in robotics can only control relatively simple objects undergoing constrained motion, or simple motion for complex objects. A majority of the visual servoing systems continue to employ artificial markers to circumvent the end-effecter and positioning data. The recent advances have allowed the development of theoretical frameworks for more complicated problems, the demonstration of real-time control for relative complex applications, and the construction of servoing systems that use no or very limited markers for the tracking process. However, the visual technology is still in developing process, and it is difficult for the technology to achieve the positioning accuracy in the micro-precision level at this stage.

Particularly, the following inventions and articles are also cited here as the close known prior arts and embodiments, which have presented some positioning technologies, or adopt some techniques in a robotic system design:

U.S. Pat. No. 6,730,541;

U.S. Pat. No. 6,144,118 A;

U.S. Pat. No. 6,744,228 B1;

U.S. Pat. No. 6,327,038;

Document No. US 2001/0044197; and

IEEE article "Task analysis of ultra-precision assembly process for automation of human skill."

The article entitled "Task analysis of ultra-precision assembly process for automation of human skill" by Yamamoto et al. investigated how highly precision assembly could be done by using two methods, i.e., the force sensory information for a smaller range and the attitude measurement for a coarse range. The said development combined the indirect control methods of force sensory technology and visual servoing technology. Therefore, the said development required the target(s) or artificial marker(s) in work-cell as the reference to form a closed-loop feedback control, and it could only conduct simple tasks. Since the two combined methods can only provide relatively rough positioning control, the said invention did not conduct ultra-precision measurement and positioning control of a robotic system.

U.S. Pat. No. 6,730,541 and Document US 2001/0044197 to Heinen et al. presented a wafer-scale assembly apparatus for integrated circuits and a method for forming the wafer-scale assembly. The said invention did not provide a structure and method for the development of a multiple DOF robotic system to conduct ultra-precision measurement and positioning control.

U.S. Pat. No. 6,144,118 A and No. 6,744,228 B1 to Cahill et al. presented a high-speed positioning apparatus. It provided a planar positioning control with a small scale of range, which could not meet the basic requirement for the development of a multiple DOF robotic system in general in 6-DOF robotic working domain. In this invention, an interferometer encoder including the two-dimensional grid was used as position detector, which could not provide the ultra-precision absolute dimensional measurement for the development of a multiple DOF ultra-precision robotic system. Furthermore, the magnetic motor positioning technology adopted in this invention was also not able to achieve ultra-precision positioning accuracy. The said invention only provided 2-DOF planar measurement and positioning control, and did not conduct a rational structure and design methodology for the development of an ultra-precision multiple DOF ($\geq$3) robotic system.

U.S. Pat. No. 6,327,038 to Maxey presented a method and apparatus which employed the interferometer system with an optical target to form a linear measurement device for measuring linear displacement and angular displacement. The said invention only provided relative linear displacement measurement along with the straight line of optical beam which was not suitable for the development of a robotic system since a robotic system relied on absolute displacement measurement in general. The said invention could not determine the angular displacement around the straight-line direction of optical beam (roll), and its capability to determine the angular displacements of target along with the pitch and yaw rotational directions was also limited. The said invention could not conduct a feasible real-time measurement since the relative linear displacement measurement with the presented device could only be done on expert's evaluation about the appearances of fringe in the ultra-precision measurement process. Moreover, the method and apparatus carried with the said invention provided a non-robust measurement technology since any slight change of working condition and interference of work-cell environment could very easily collapse the measurement process.

From the above discussions, the cited arts and inventions appear difficult to build a multiple DOF ($\geq$3) robotic system to achieve ultra-precision positioning accuracy. It is also obvious that The design methodologies of aforesaid related inventions and documents are not necessarily to develop a multiple DOF ($\geq$3) ultra-precision shadow robotic measurement system that consists of linkages, kinematic joints, and sensors that are mated with the kinematic joints to form a passive servo-measurement system with proper DOF to monitor the position and orientation of an object with its own end-effecter through a connection-point.

The design methodologies of aforesaid related inventions and documents are not necessarily to develop an apparatus that integrates a multiple DOF ($\geq$3) ultra-precision shadow robotic measurement system with a multiple DOF robot to establish a structure of closed-loop linkage chain to form a multiple DOF ($\geq$3) ultra-precision robotic system that can achieve multiple DOF ultra-precision measurement and positioning control of end-effecter in 6-DOF (X, Y, Z, pitch, roll, and yaw) robotic working domain.

The design methodologies of aforesaid related inventions and documents are not necessarily to develop an apparatus to establish a closed-loop feedback control of a multiple DOF ($\geq$3) ultra-precision robotic system associated with the said closed-loop linkage chain without the use and limitation of any target or artificial marker in work-cell as the reference.

In such a situation, it calls for more ideas and innovative researches. It is therefore an object of this invention to develop a robotic system to have the capability to achieve ultra-precision positioning accuracy to overcome the above-said influences of the degrading factors to claim the important role of robotic system in modem ultra-precision engineering.

BRIEF SUMMARY OF THE INVENTION

Figure 1:
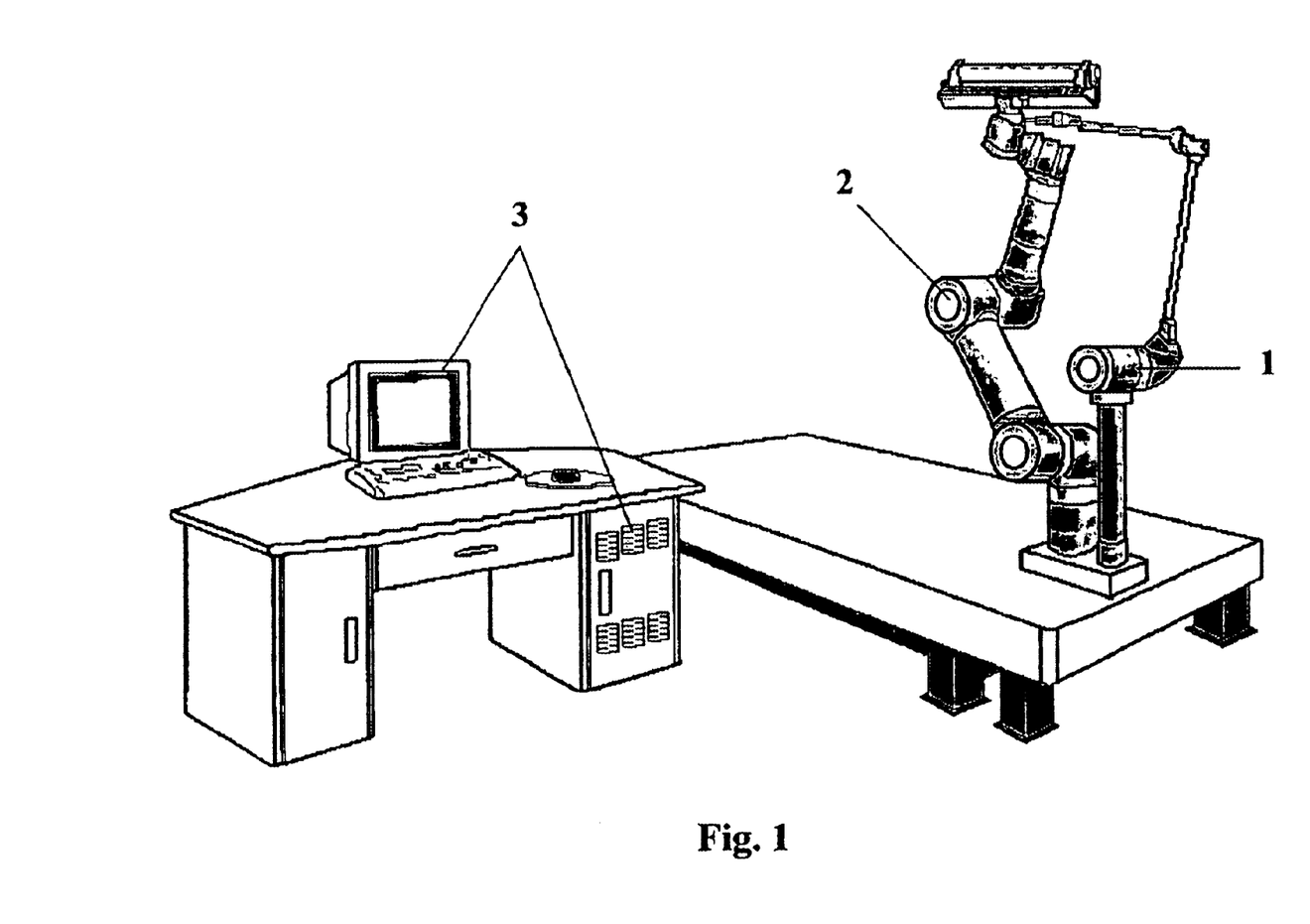
FIG. 1 is a general 3-D view of an embodiment of the invention.

In this invention, a multiple degree-of-freedom (DOF) ultra-precision robotic system is developed based on the design methodology of integrating a multiple DOF ultra-precision shadow robotic measurement system with a multiple DOF robot [FIG. 1] that forms a unique closed-loop linkage chain. Following the above classification, it can be classified as in the indirect robotic control technology. However, the robotic control technology is unique since it can establish a closed-loop feedback control associated with the said closed-loop linkage chain without the use of a special designated target or an artificial marker as the reference in work-cell like the other types of indirect robotic control technology. With the invention, some of the above-mentioned degrading influences with existing robotic system can be fairly resolved. The invention is then characterized by providing the following features of development because of the integration of the multiple DOF ultra-precision shadow robotic measurement system and the multiple DOF robot.

One of the features of the invention is to provide a multiple DOF ultra-precision shadow robotic measurement system that consists of linkages, kinematic joints, and sensors which are mated with the kinematic joints to form a passive servo-measurement system with proper DOF ($\geq$3) to monitor the position and orientation of an object with its end-effecter through a connection-point.

Another feature of the invention is to provide a multiple DOF ($\geq$3) ultra-precision robotic system with the integration of said multiple DOF ultra-precision shadow robotic measurement system and a multiple robot to a unique structure of closed-loop linkage chain.

The other feature of the invention is to provide a unique structure which establishes a closed-loop feedback control of a multiple DOF ultra-precision robotic system associated with the said closed-loop linkage chain to achieve multiple DOF ($\geq$3) ultra-precision measurement and positioning control of end-effecter of said multiple DOF robot in 6-DOF (X, Y, Z, pitch, roll, and yaw) robotic working domain without the use and limitation of any target or artificial marker in work-cell as the reference.

Such features provide the best chance for the invention to overcome above-mentioned degrading influences for a multiple DOF robotic system to achieve the ultra-precision positioning accuracy. The invention, with its organization, working method, manner of operation, and utilization can be best understood by making reference to the following description and the drawings.

DETAILED DESCRIPTION OF THE INVENTION

Shadow Robotic Measurement System of the Invention

Figure 2:
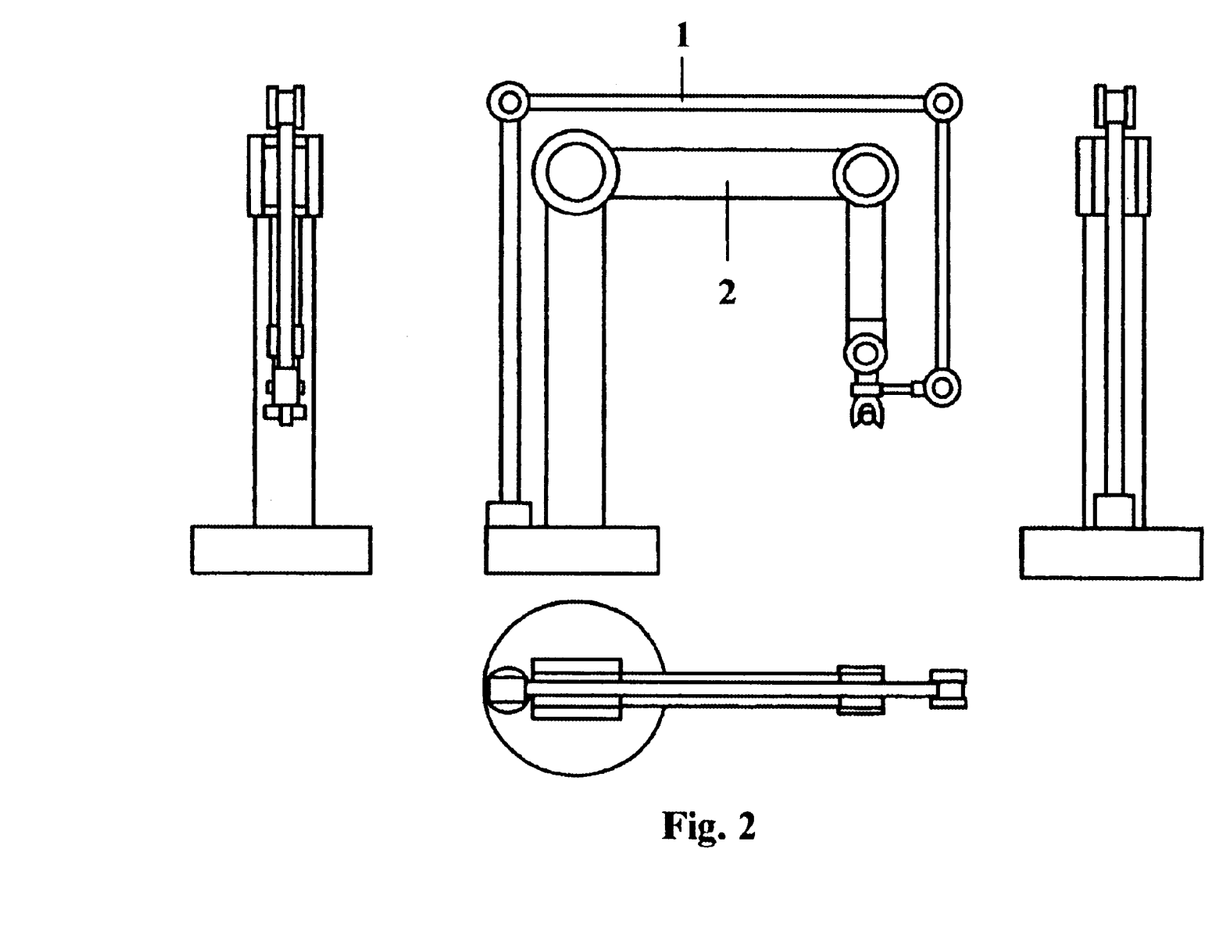
FIG. 2 is an over all drawing of an embodiment of the invention with the top view, side view, front view, and rear view.

In this invention, an ultra-precision robotic system is developed based on the development of the novel technology of multiple DOF ultra-precision shadow robotic measurement system (shadow system,) which can effectively resolve the above-mentioned degrading problems to achieve the ultra-precision positioning accuracy with no significant difficulties. FIG. 1 depicts that such an ultra-precision robotic system. In FIG. 1, (1) is an embodiment of multiple DOF ultra-precision shadow robotic measurement system, (2) is an embodiment of multiple DOF robot, and (3) is the robotic control with corresponding computer system. FIG. 2 depicts the basic structure of such an ultra-precision robotic system with more detailed different views. In FIG. 2, it shows that for a 6-DOF robot, an ultra-precision shadow robotic measurement system with at least 6 DOF is built to match the DOF of robot. The said 6-DOF robot and the said shadow system are connected together through a connection-point (CP) on their end-effecter frames. The shadow system is a passive system. Under the pulling force of the robot acting on CP, the shadow system can freely follow the motion of the robot and stand no load.

With this embodiment in FIG. 2, all the joints of the shadow system are revolute, and each of the revolute joints is mated with a corresponding rotary measurement sensor to record the relative angular displacements of the joint. For achieve ultra-precision measurement, here, the optical rotary encoder is recommended to detect the angular displacements. With the angular displacements of the joints detected by the rotary encoders, the shadow system can then independently determine the position of end-effecter frame of the matched robot. Generally, a shadow robotic measurement system may have both revolute and prismatic joints. In such a case, the revolute joint should is mated with a corresponding rotary measurement sensor to record the angular displacement, and the prismatic joint should is mated with a corresponding linear measurement sensor to record the linear displacement.

From FIG. 2, it is known that the shadow system has formed a control loop independent of the kinematic chain of the robot to determine the position of the end-effecter of robot. It means that all these degrading factors associated with the mated robot have nothing to do with the control loop formed by the shadow system. The control loop of the shadow system can communicate with the matched robot through the connected position of the end-effecter frame. In this way, the degrading factors of the robot can be treated with a black box effect, and only the combined influence of final position change of the end-effecter frame is needed as the feedback signal of the closed-loop control. With the feedback, the robotic control system can determine the actual position of the end-effecter frame of the robot; therefore, it can then excite its actuators step by step to finally drive the end-effecter frame to the designated position. This control process and algorithm is a unique real-time closed-loop feedback control which is only associated with the integration of the multiple DOF shadow robotic measurement system and the multiple DOF robot. The working process of the shadow system is further described in detail as follows:

When the 6-DOF robotic system in FIG. 1 and FIG. 2 is needed to send the end-effecter of the robot to a desired position, at first, it finds the inverse kinematics solutions of the robot and excites its actuators yielding the solutions of inverse kinematics to move the end-effecter frame to that desired position. If the robotic system is ideal, then the end-effecter can exactly reach the desired position without error. However, because of these above-mentioned inevitable degrading problems, the end-effecter frame is not able to achieve the desired position yielding the ideal solutions of inverse kinematics, and the robotic system is not even able to know the position of the end-effecter frame of the robot in the working process. In this case, since the shadow robotic measurement system is ideal, it can detect the position of the end-effecter. With the detected data by the shadow system, the robotic control system is able to determine the differences between the actual position of the end-effecter of the robot and the desired position. By using the differences as feedback-control data, the robotic control system can then move the end-effecter of robot frame to reach the designated position. With continuation of the process step by step, the robotic system can finally achieve the desired position.

It is clear that the positioning accuracy of the robotic system totally relies on the measurement accuracy of the shadow system. The following discussions is for the better understanding of why the shadow system can be considered ideal, and why it can achieve the ultra-precision measurement accuracy to meet the requirements for the development of an advanced ultra-precision robotic system:

No Significant Deformation Under Loads:

It is noted that the shadow robotic measurement system passively follows the motion of the matched robot, and the change of the loads acting on the robot has nothing to do with the shadow system. Since it stands no working loads, the shadow system can be made very light, and all the rotary encoders, joints, and the links in the shadow system will stand only insignificant frictional forces, gravity, and dynamic forces caused by the light mass of itself. It means the deformation with the system can be ignored because the linkages of the system are relatively strong as compared with these insignificant forces. In this way, the shadow system can then be considered an ideal rigid system.

The Influence of Tolerance Error can be Controlled in nm Level:

There are two kinds of tolerances with the shadow robotic measurement system. One is the manufacturing tolerance and the other is the assembly tolerance.

The manufacturing tolerance is designed for the dimensional restriction of manufacturing a component. Once the element is manufactured, its dimension is unchangeable yielding the range of tolerance. After manufacturing, the actual dimension of tolerance can be measured and merged with the old structural nominal parameter as the new nominal parameter. The assembly tolerance is designed for the dimensional restriction of assembling related components. Also, once the components are assembled, the dimensions to mark the positions of the fixed components are unchangeable yielding the range of tolerance. After assembly, the actual dimension of tolerance can be measured and merged with the old structural nominal parameter to form the new nominal parameter.

The error to measure the new nominal parameter is the accuracy of the measurement instrument. With low expectation of positioning accuracy, the error of dimensional measurement can be controlled in 1 $\mu$m level with common linear optical encoder. If necessary, with high expectation of positioning accuracy, it is known that the error of dimensional measurement can be controlled in 1 nm level or more precise with a specialized laser interferometer measurement platform.

The Influence of Clearance Error can be Controlled in Ultra-precision Level:

Two kinds of clearance exist in the shadow robotic measurement system. One is the assembly clearance, and the other is the motion clearance for kinematic pairs. The assembly clearance is designed for easily assembling components together. After the assembly, the components are fixed and there is no relative motion between the components. As in the previous case, once the components are fixed, the relative dimensions between components are unchangeable. The actual dimension of assembly clearance corresponding to fixed components can be measured and merged with the old structural nominal parameter as the new nominal parameter. The error of new dimensional parameter is the accuracy of the measurement instrument, which can be controlled in 1 nm level or more precise if necessary.

The motion clearance for kinematic pair is designed for guaranteeing the relative motion between connected components. After the assembly, there will be uncertain gap for the relative motion between the components. The gap is the major problem to degrade the positioning accuracy, and is also the source for contamination, backlash, and thin film of lubrication. Usually, this problem is unavoidable. However, it is noted that, if there is no force or only a very small force acting on the motion pair, a light duty ultra-precision bearing sets can be used to form a revolute joint pair. In such a case, the rollers can rotate on races with pure rolling of non-gap motion, and the error of clearance between the rolling rollers and the races are insignificant and can be ignored.

Measured Joint Rotational Displacement Error:

Since an ultra-precision rotary optical encoder can be mated with the ultra-precision bearing mounted at the revolute joint pair, it means that the measurement error of the rotational displacement yields the error of the ultra-precision optical encoders. On the current market, the resolution of the existing optical rotary encoder with 3.5 in diameter can achieve 4,608,000 counts/revolution, that is 0.28 arc-second. The finer the employed rotary encoder, the less the measurement error of the rotational displacement. It is also noted that if an ultra-precision rotary encoder with 32-bit unique steps can be used to build the shadow system, the measurement error of rotational displacement is about $3\times10^{-4}$ arc-second. Since the encoder is directly mounted on the joint to measure the relative angular displacement of joint shaft and joint house, the measurement accuracy is the resolution of the encoder.

Figures 3, 4:
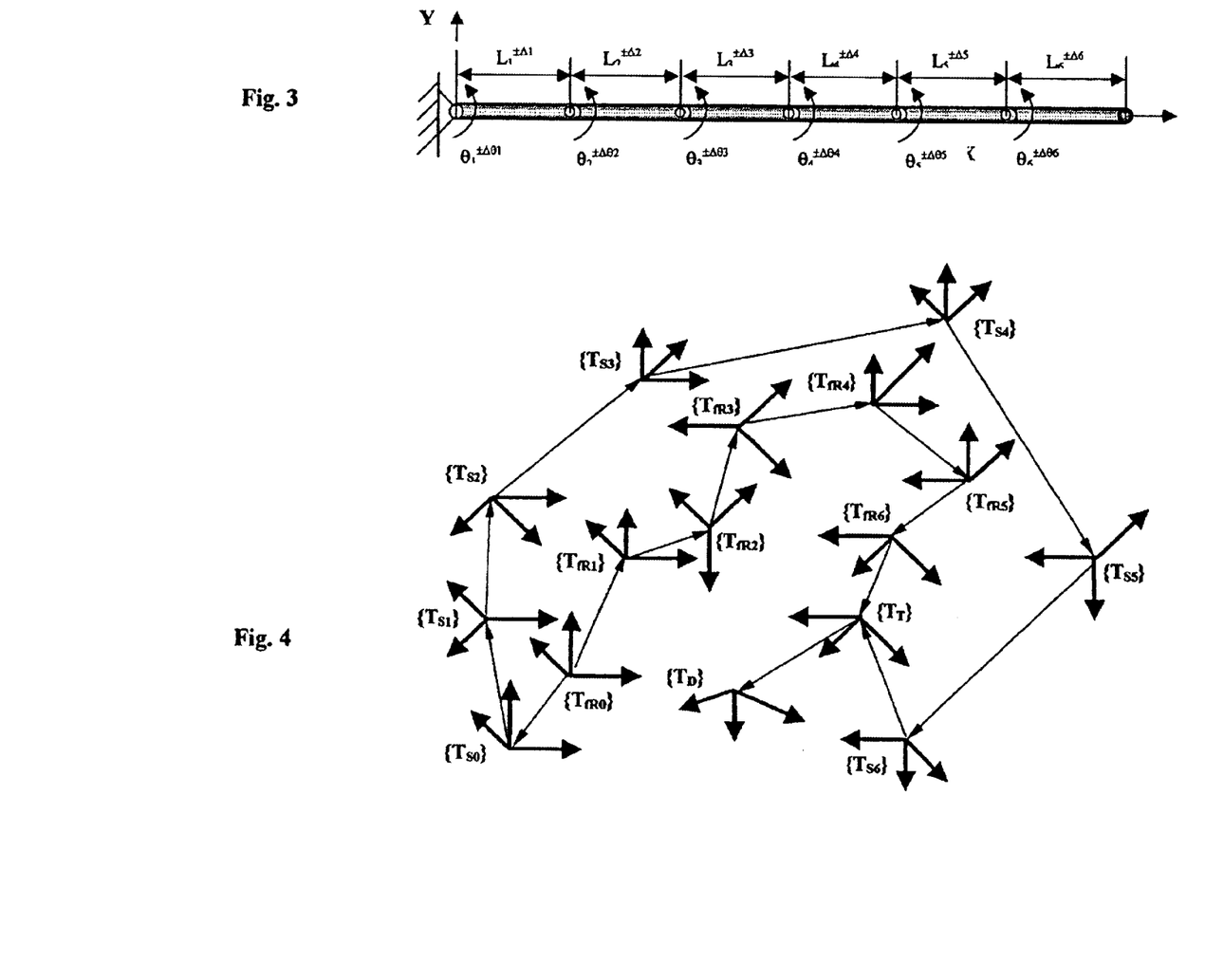
FIG. 3 is the drawing of an extremely built 6-D rational joint robot for error analysis.
FIG. 4 is the transformation of the link frames of robotic system and shadow robotic measurement system.

Rough Estimation of the Measurement Accuracy of the Shadow System:

The measurement accuracy of a shadow robotic measurement system can be roughly estimated. If a 6-D robotic system with 6 dimensional linkages is adopted to build the passive shadow system, the measured maximum linear error will not be larger than $$\Delta D_x = \pm \sum_{i=1}^{6} |\Delta_i|$$

with an extreme design of robotic system in which the 6 links are arranged in a line (FIG. 3). Here, $\Delta D_X$ is the linear dimensional error in X axis direction, and $\Delta_i$ is the measurement error to measure the element i. If necessary, $\Delta_i$ can be controlled in 1 nm level or better. The total error is 6 nm.

With FIG. 3, the linear dimensional error in Y direction is caused by the rotational error, and the measured maximum linear dimensional error is $$\Delta D_Y = \pm \sum_{i=1}^{6} |L_i \Delta \theta_i|$$

If the above optical rotary encoder is used, and each of the links of the robot is 500 mm, then the maximum linear dimensional error caused by the rotational error is 4 nm. The error analysis of the two extreme cases error will be combined to determine the maximum linear dimensional error.

Also, if a 6-D robotic system with 6 rotational joints is adopted to build the passive shadow robotic measurement system, the measured maximum rotational error of pitch without the influence of structural correlation will not be in excess of $$\Delta \theta = \pm \sum_{i=1}^{6} |\Delta \theta_i|$$

with the extreme design of the robotic system that all the joints rotate around Y axis in the same direction or reversed direction (FIG. 3). Here, $\Delta \theta$ is the rotational displacement measurement error of pitch, and $\Delta \theta_i$ is the measurement error to measure the rotational displacement of joint i. $\Delta \theta_i$ yields the measurement accuracy of 0.28 arc-second if the above-mentioned 4,608,000 counts/revolution optical rotary encoder existing on the current market is used to build the monitoring system of the joint angular displacement.

The estimate shows that, with low expectation of positioning accuracy, the major errors of the shadow system caused by the measurement of rotational error and the tolerance and clearance with the extreme design of robot are $$ERR=\{\Delta D, \Delta\theta\}=\pm\{7.21 \, \mu m, 1.68 \text{ arc-second}\}$$

Since the rough estimate is based on the extreme case of robotic system with 6 rotational joints, it is noted that a real robotic system will not be built with all links in a line and all joints around one direction of a rotational axis as the one in FIG. 3 to cause the extreme error. By taking the average of the negative and positive factors, it is estimated that the total errors with a non-extreme case of real robotic system should be around the same level of the above-discussed extreme case. Based on the discussions, with more conservative estimation, the following rounded goal is expected as low expectation of the invention:

Low expectation with 4,608,000 resolution encoder:
$ERR_{Absolute}=\{10 \, \mu m, 2.5 \text{ arc-second}\}$ The estimate is based on the use of common optical rotary encoder on the market. If an ultra-precision rotary encoder can be adopted, the positioning accuracy with the invention will be much higher. For example, if an ultra-precision rotary encoder with 32-bit resolution is used, the following rounded goal of high expectation can be achieved:

High expectation with 32-bit resolution encoder:
$ERR_{Absolute}=\{10 \text{ nm}, 10^{-2} \text{ arc-second}\}$ No Wear Between Kinematic Joints:

Since there is no load on the shadow system and the frictional forces acting on the joints are insignificant, the wear of the kinematic joints can be ignored for quite a long time period.

The Shadow System can have a Good and Stable Working Condition:

Since the shadow robotic measurement system is independent, it is easy to provide an isolated environment for it to have good and stable working conditions. In this case, the work cell environment and the ambient conditions, especially the temperature, will not significantly drag down the positioning accuracy of the robotic system. Generally speaking, the temperature error may degrade the positioning accuracy. To guarantee the success of the project and prevent the system from the influence of ambient conditions, the following four methods basically used in current engineering practices will be considered.

1. Use cooling agent to control the change of temperature caused by heat sources
2. Restrict the working cell of the system in the designated working condition
3. Have an isolation design to isolate the system from all the heat sources
4. Design an ambient condition control system to cover the equipment Generally speaking, these methods are effective to control the temperature error for the robotic system in the designated ambient conditions to achieve ultra-precision accuracy.

Inverse Kinematics of the Invention

With reference of FIG. 1, FIG. 2, and FIG. 4, the inverse kinematics of a 6 DOF ultra-precision integrated robotic system to move its end-effecter frame to a desired target can be determined. In FIG. 4, $\{T_{fR0}\}$ is the zero frame of the mated conventional robot; $\{T_{SO}\}$ is the zero frame of the shadow system; $\{T_D\}$ is the desired target frame; $\{T_T\}$ is the actual end-effecter frame; $\{T_{fRi}\}$ is the joint frame of the robot, and i=1,2, ... 6; and $\{T_{Sj}\}$ is the joint frame of the shadow system, and j=1,2, ... , 6. In FIG. 4, the transformation from $\{T_{fR0}\}$ to $\{T_{SO}\}$ is $$^{RO}_{SO}T,$$

the transformation from $\{T_{S6}\}$ to $\{T_T\}$ is $_T^6 T_S$, and the transformation from $\{T_{fR6}\}$ to $\{T_T\}$ is $_T^6 T_R$. These transformation forms are determined in association with the design and manufacturing and all are known. The link transformation of the robot can be expressed as $$_6^0 T_{fR} =\, _1^0 T_{fR} \,_2^1 T_{fR} \,_3^2 T_{fR} \,_4^3 T_{fR} \,_5^4 T_{fR} \,_6^5 T_{fR}$$

$$_T^0 T_{fR} =\, _6^0 T_{fR} \,_T^6 T_{fR}$$

Because of the errors of the robot, $_6^0 T_{fR}$ it is unknown, and so is $_T^0 T_{fR}$.

To resolve the inverse kinematics, a virtual 6 DOF robot is imaged to implement the same kinematic control process. The virtual robot is used with the same way as the real industrial robot; however, there are no any errors since it is ideal. The transformation of the ideal virtual robot is $$_6^0 T_{fR} =\, _1^0 T_{fR} \,_2^1 T_{fR} \,_3^2 T_{fR} \,_4^3 T_{fR} \,_5^4 T_{fR} \,_6^5 T_{fR}$$

$$_T^0 T_{fR} =\, _6^0 T_{fR} \,_T^6 T_{fR}$$

It leads to $$_T^0 T_R = T_D$$

$$_6^0 T_R =\, _T^0 T_R \,_T^6 T_R^{-1} = T_D \,_T^6 T_R^{-1}$$

With the robotic inverse kinematics analysis, the angular configurations of the virtual ideal rigid robot can be obtained, and $$\theta_V = \{\theta_{1V}, \theta_{2V}, \theta_{3V}, \theta_{4V}, \theta_{5V}, \theta_{6V}\}^T$$

which is the absolute angular displacement with reference of the zero frame of the joint to control the integrated industrial robot. By using $\theta v$ as the input of the joints of the robot, if the robot has no error, then $$_T^0 T_{fR} =\, _T^0 T_R = T_D$$

However, because of errors, it leads $$_T^0 T_{fR} \neq\, _T^0 T_R$$

At this moment, if there is no effective way to resolve the problem, the robot will lose control since it cannot exactly determine its end-effecter frame. With the help of the shadow system, the end-effecter frame of robot in the space of the shadow system can be monitored. The exact end-effecter $T_T$ within the space of the shadow system is $_T^0 T_S$, and $$_T^0 T_S =\, _1^0 T_S \,_2^1 T_{S3} \,_4^3 T_S \,_5^4 T_S \,_6^5 T_S \,_T^6 T_S$$

and which is known based on the measurement of the shadow system. The transformation of $T_T$ in the space of the robot is $_T^0 T_{fR}$, and it cannot be directly known. However; it can be obtained with the following transformation, and $$_T^0 T_{fR} =\, _{SO}^{RO} T \,_T^0 T_S =\, _6^0 T_{fR} \,_T^6 T_{fR}$$

It leads to the determination of $_6^0T_{fR}$, and $$_6^0T_{fR} = {_T^0}T_{fR}{_T^6}T_{fR}^{-1} = {_{SO}^{RO}}T_T^0T_S^T{_T^6}T_{fR}^{-1}$$

By driving the end-effecter of virtual robot to the current misplaced end-effecter of the robot, the solution of inverse kinematics is $$\theta_f = \{\theta_{1f}, \theta_{2f}, \theta_{3f}, \theta_{4f}, \theta_{5f}, \theta_{6f}\}^T$$

It is the actual angular displacements of the virtual robot. The difference caused by the errors is $$\theta_V - \theta_f = \{\theta_{1V} - \theta_{1f}, \theta_{2V} - \theta_{2f}, \theta_{3V} - \theta_{3f}, \theta_{4V} - \theta_{4f}, \theta_{5V} - \theta_{5f}, \theta_{6V} - \theta_{6f}\}^T$$

that is, $$\delta\theta = \theta_V - \theta_f = \{\delta\theta_1, \delta\theta_2, \delta\theta_3, \delta\theta_4, \delta\theta_5, \delta\theta_6\}^T$$

$\delta\theta$ is the feedback data needed for the mated industrial robot of the ultra-precision integrated robotic system to achieve the desired target in the next step. To cover the difference and to achieve the desired position and orientation of target, the joint configurations of inverse kinematics should have an extra displacement $\delta\theta$. The total absolute joint displacement referring to zero position with the mated robot is of the $\theta_{VT}$, and $$\theta_{VT} = \theta_V + \delta\theta$$

If the end-effecter frame measured with the shadow system has still not reached the desired target frame, then, the next step yielding above process is needed. With the scheme of approach control step by step, the mated robot can finally achieve the desired target frame with ultra-precision positioning accuracy.

Error Analysis of the Invention

Since the almost ideal shadow robotic measurement system is still not ideal, the error analysis is necessary to know the performance of the shadow system. It will particularly study the feasibility of the technology and demonstrate if the invention can achieve the expected positioning accuracy. With a working process design of the robotic system, the target position of end-effecter of the system can be written with a functional expression of $$Y = \{P_X, P_Y, P_Z, \theta_R, \theta_P, \theta_Y\}^T = F(\Theta, \Phi)$$

Here, $P_X$, $P_Y$, and $P_Z$ are the origin. $\theta_R$, $\theta_P$, and $\theta_Y$ are rotational angles to the axes X, Y, and Z, which are also defined as Roll, Pitch, and Yaw in general. $\Theta = \{\theta_1, \theta_2, \ldots, \theta_n\}$, which are the n measured joint displacements of the n-D passive shadow system. $\Phi = \{\phi_1, \phi_2, \ldots, \phi_m\}$, which are the m dimensional parameters with Denavit-Hartenberg (D-H) notation that are used to identify such a shadow system. With Taylor-series, the functional expression of the target can be further expressed as $$Y = F(\Theta^{nom}, \Phi^{nom}) + \sum_{i=1}^{m} \frac{\partial F}{\partial \phi_i}\bigg|_{nom}(\phi_i - \phi_i^{nom}) + \sum_{j=1}^{n} \frac{\partial F}{\partial \theta_j}\bigg|_{nom}(\theta_j - \theta_j^{nom}) + \ldots$$

Here, $\Theta^{nom} = \{\theta_1^{nom}, \theta_2^{nom}, \ldots, \theta_n^{nom}\}$ are the nominal displacements measured with the shadow robotic measurement system. $\Phi^{nom} = \{\phi_1^{nom}, \phi_2^{nom}, \ldots, \phi_m^{nom}\}$ are the nominal dimensions of the shadow system. For the small and independent variations of the nominal configurations, a linear approach of the Taylor series can be written as $$Y \approx F(\Theta^{nom}, \Phi^{nom}) + \frac{\partial F}{\partial \Phi}\bigg|_{nom}(\Phi - \Phi^{nom}) + \frac{\partial F}{\partial \Theta}\bigg|_{nom}(\Theta - \Theta^{nom})$$

It leads to $$\Delta Y \approx \frac{\partial F}{\partial \Phi}\Delta\Phi + \frac{\partial F}{\partial \Theta}\Delta\Theta$$

This is the analytic error of the shadow robotic measurement system. It relates the component variability $\Delta\Phi$ in the D-H parameter space and measured angular displacement variability $\Delta\Theta$ in the joint space of the shadow system to the output variation $\Delta Y$ in Cartesian space, where, all higher order effects are neglected.

Since the worst performance of the shadow system can occur for any combination of minimum and maximum values of parameters $\Delta\Phi$ and $\Delta\Theta$, to guarantee the implementation of the work of the proposed project, the worst-case error estimate will be employed. In the worst-case error estimate, the parameters $\Delta\Phi$ and measured input variations $\Delta\Theta$ are assumed to take the value $\Delta\Phi_{min}$ or $\Delta\Phi_{max}$ and $\Delta\Theta_{min}$ or $\Delta\Theta_{max}$ respectively. To each of the items, the maximum value of error is adopted, that is $$\Delta Y = \Delta F\Phi + \Delta F\Theta$$
$$= \{\Delta P_X, \Delta P_Y, \Delta P_Z, \Delta\theta_R, \Delta\theta_P, \Delta\theta_Y\}^{-1}$$

Here, $\{\Delta P_X, \Delta P_Y, \Delta P_Z\}$ are the positioning errors of origin; and $\{\Delta\theta_R, \Delta\theta_P, \Delta\theta_Y\}$ are the angular errors corresponding to Roll, Pitch, and Yaw. $\Delta F\,\Phi$ is the maximum of the multiplied product of $$\frac{\partial F}{\partial \Phi}$$

and $\Delta\Phi$. $\Delta F\,\Theta$ is the maximum of the multiplied product of $$\frac{\partial F}{\partial \Theta}$$

and $\Delta\Theta$. That is, $$\Delta F\Phi = \text{Max.}\left\{\frac{\partial F}{\partial \Phi}\Delta\Phi_{min}, \frac{\partial F}{\partial \Phi}\Delta\Phi_{max}\right\}$$

$$\Delta F\Theta = \text{Max.}\left\{\frac{\partial F}{\partial \Theta}\Delta\Theta_{min}, \frac{\partial F}{\partial \Theta}\Delta\Theta_{max}\right\}$$

With the analysis of inverse kinematics, the joint error, $\Delta\theta$, caused by $\Delta Y$ can be determined, and $$\Delta\theta = \{\Delta\theta_1, \Delta\theta_2, \Delta\theta_3, \Delta\theta_4, \Delta\theta_5, \Delta\theta_6\}$$

which will be used to adjust the difference $\delta\theta$ to carry out more effective feedback control for the robotic system to more accurately achieve the desired position.

Figure 5:
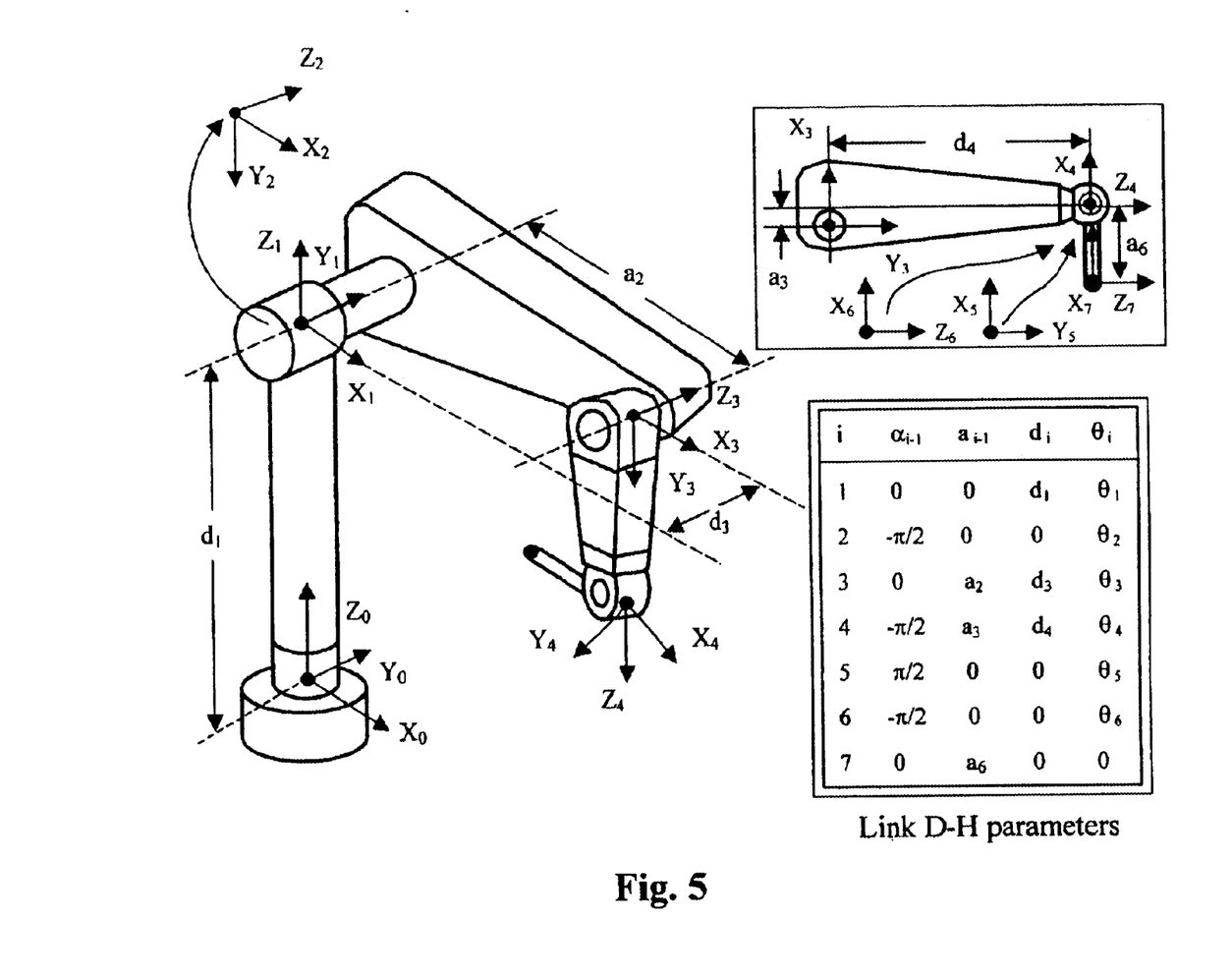
FIG. 5 is the drawing of a Puma 560 Type Shadow Robotic Measurement System for general for error analysis.
Figure 6:
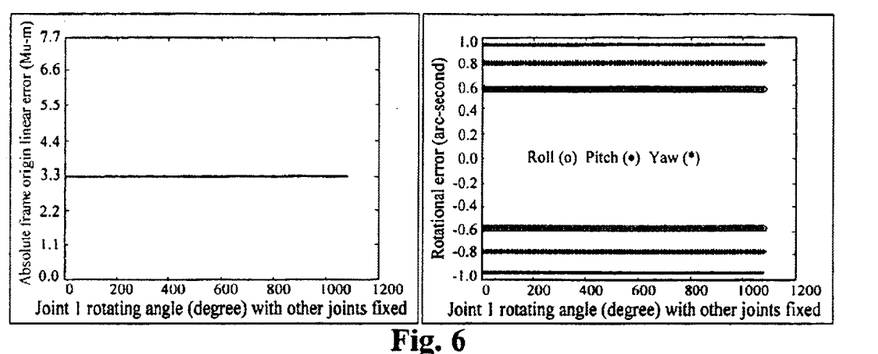
FIG. 6 is the computer simulation results of analytical errors with the joint configuration of $\Theta=\{\theta_1=0\sim1080°; \theta_2=218°; \theta_3=210°; \theta_4=71°; \theta_5=84°; \theta_6=39°\}$.
Figure 7:
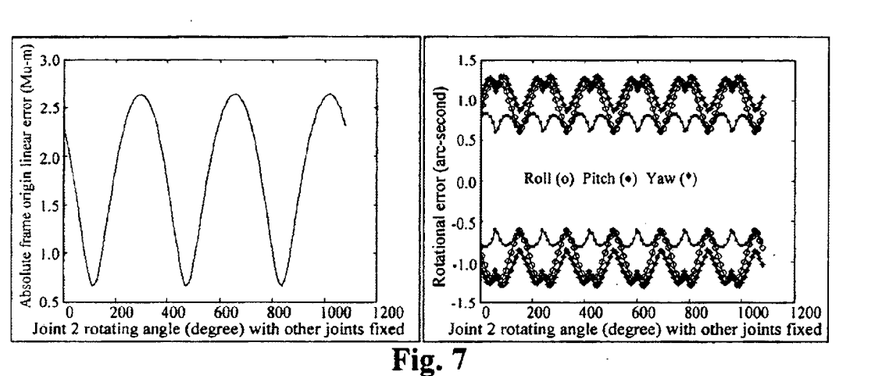
FIG. 7 is the computer simulation results of analytical errors with the joint configuration of $\Theta=\{\theta_1=67°; \theta_2=0\sim1080°; \theta_3=214°; \theta_4=172°; \theta_5=183°; \theta_6=40°\}$.
Figure 8:
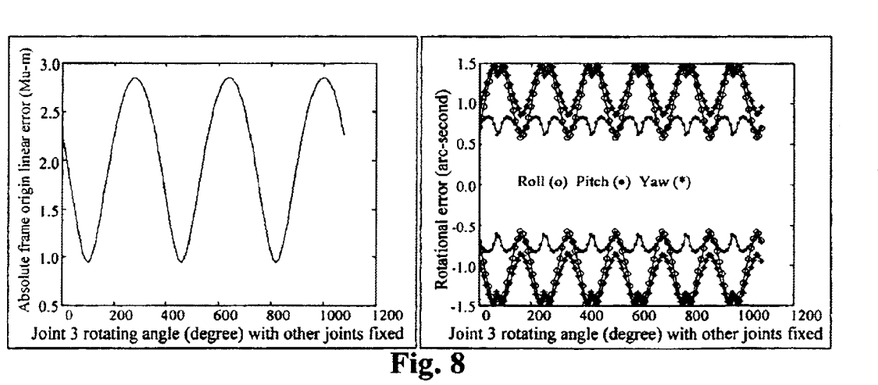
FIG. 8 is the computer simulation results of analytical errors with the joint configuration of $\Theta=\{\theta_1=88°; \theta_2=18°; \theta_3=0\sim1080°; \theta_4=174°; \theta_5=181°; \theta_6=132°\}$.
Figure 9:
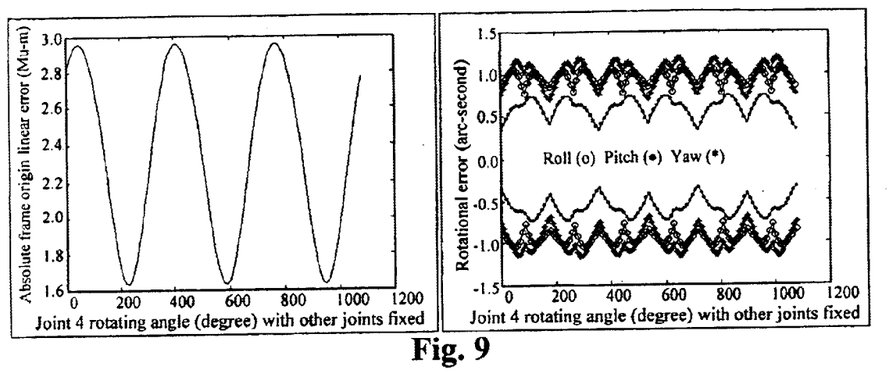
FIG. 9 is the computer simulation results of analytical errors with the joint configuration of $\Theta=\{\theta_1=186°; \theta_2=118°; \theta_3=22°; \theta_4=0\sim1080°; \theta_5=12°; \theta_6=92°\}$.
Figure 10:
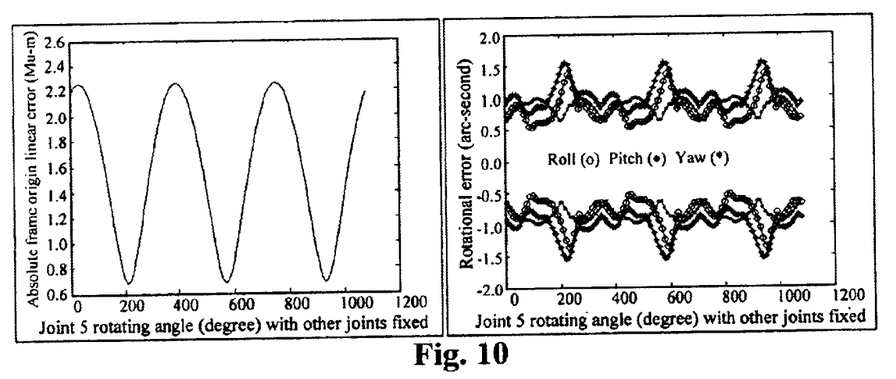
FIG. 10 is the computer simulation results of analytical errors with the joint configuration of $\Theta=\{\theta_1=86°; \theta_2=318°; \theta_3=92°; \theta_4=73°; \theta_5=0\sim1080°; \theta_6=12°\}$.
Figure 11:
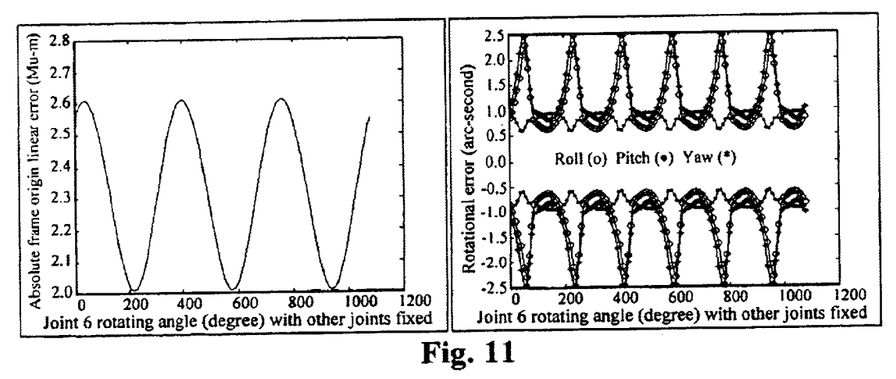
FIG. 11 is the computer simulation results of analytical errors with the joint configuration of $\Theta=\{\theta_1=217°; \theta_2=38°; \theta_3=193°; \theta_4=91°; \theta_5=232°; \theta_6=0\sim1080°\}$.

Example of Error Analysis with a Puma 560 Embodiment of Shadow Robotic Measurement System To carry out the error analysis, a robotic structure of a 6-D Puma 560 robot is used here as an exemplary embodiment of the shadow robotic measurement system, except all the actuators of Puma 560 are replaced with optical rotary encoders which will be passively moved by the drawing force acting at the end-effecter connection-point (CP) generated by the robotic system (FIG. 5). The dimensions of the shadow robotic measurement system yielding the D-H parameters are $a_2=1$ m, $a_3 0.02$ m, $a_6=0.1$ m, $d_1=1$ m, $d_3=0.15$ m, $d_4=0.6$ m.

Derivation of the General Analytic Positioning Error of the System

The above maximum error analysis gives the basic idea about the limitation of the positioning accuracy of the robotic system. In the approaching process to achieve the desired position, with each of the steps, the results of analytic error analysis is needed to justify the solution of the inverse kinematics for the end-effector of the robotic system to finally research its desired position. The processes of analytic error analysis are demonstrated below:

Determination of System Transformations:

The transformations of the Puma 560 shadow robotic measurement system can be determined as follows:

$$^0_1T = \begin{pmatrix} c_1 & -s_1 & 0 & 0 \\ s_1 & c_1 & 0 & 0 \\ 0 & 0 & 1 & d_1 \\ 0 & 0 & 0 & 1 \end{pmatrix} \quad ^1_2T = \begin{pmatrix} c_2 & -s_2 & 0 & 0 \\ 0 & 0 & 1 & 0 \\ -s_2 & -c_2 & 0 & 0 \\ 0 & 0 & 0 & 1 \end{pmatrix}$$

$$^2_3T = \begin{pmatrix} c_3 & -s_3 & 0 & a_2 \\ s_3 & c_3 & 0 & 0 \\ 0 & 0 & 1 & d_3 \\ 0 & 0 & 0 & 1 \end{pmatrix} \quad ^3_4T = \begin{pmatrix} c_4 & -s_4 & 0 & a_3 \\ 0 & 0 & 1 & d_4 \\ -s_4 & -c_4 & 0 & 0 \\ 0 & 0 & 0 & 1 \end{pmatrix}$$

$$^4_5T = \begin{pmatrix} c_5 & -s_5 & 0 & 0 \\ 0 & 0 & 1 & 0 \\ s_5 & c_5 & 0 & 0 \\ 0 & 0 & 0 & 1 \end{pmatrix} \quad ^5_6T = \begin{pmatrix} c_6 & -s_6 & 0 & 0 \\ 0 & 0 & 1 & 0 \\ -s_6 & -c_6 & 0 & 0 \\ 0 & 0 & 0 & 1 \end{pmatrix}$$

$$^6_7T = \begin{pmatrix} 1 & 0 & 0 & -a_6 \\ 0 & 1 & 0 & 0 \\ 0 & 0 & 1 & 0 \\ 0 & 0 & 0 & 1 \end{pmatrix} \quad ^0_7T = \begin{pmatrix} r_{11} & r_{12} & r_{13} & P_X \\ r_{21} & r_{22} & r_{23} & P_Y \\ r_{31} & r_{32} & r_{33} & P_Z \\ 0 & 0 & 0 & 1 \end{pmatrix}$$

$r_{11}=c_1[c_{23}(c_4c_5c_6-s_4s_6)-s_{23}s_5c_6]+s_1(s_4c_5c_6+c_4s_6)$ $r_{21}=s_1[c_{23}(c_4c_5c_6-s_4s_6)-s_{23}s_5c_6]-c_1(s_4c_5c_6+c_4s_6)$ $r_{31}=-s_{23}(c_4c_5c_6-s_4s_6)-c_{23}s_5c_6$ $r_{12}=c_1[c_{23}(-c_4c_5s_6-s_4c_6)+s_{23}s_5s_6]+s_1(c_4c_6-s_4c_5s_6)$ $r_{22}=s_1[c_{23}(-c_4c_5s_6-s_4c_6)+s_{23}s_5s_6]-c_1(c_4c_6-s_4c_5s_6)$ $r_{32}=-s_{23}(-c_4c_5s_6-s_4c_6)+c_{23}s_5s_6$ $r_{13}=-c_1(c_{23}c_4s_5+s_{23}c_5)-s_1s_4s_5$ $r_{23}=-s_1(c_{23}c_4s_5+s_{23}c_5)+c_1s_4s_5$ $r_{33}=s_{23}c_4s_5-c_{23}c_5$ $P_X=c_1(a_2c_2+a_3c_{23}-d_4s_{23})-d_3s_1-r_{11}a_6$ $P_Y=s_1(a_2c_2+a_3c_{23}-d_4s_{23})+d_3c_1-r_{21}a_6$ $P_Z=-a_3s_{23}-a_2s_2-d_4c_{23}+d_1-r_{31}a_6$

Here, $c_i=\cos\theta_i$ and $s_i=\sin\theta_i (i=1, 2, \ldots, 6)$ $c_{23}=c_2c_3-s_2s_3$ $s_{23}=c_2s_3+s_2c_3$ System Mathematical Model:

The mathematical model of the shadow system corresponding to the frame position of end-effecter CP is $Y=F(\Theta, \Phi)$ which leads to $Y=\{P_X, P_Y, P_Z, \gamma, \beta, \alpha,\}^T=\{P_X, P_Y, P_Z, \theta_R, \theta_P, \theta_Y\}^T$ Here, $\theta_R=A\tan 2(r_{32}, r_{33})$ $\theta_P=A\tan 2(-r_{31}, \sqrt{r_{11}^2+r_{21}^2})$ $\theta_Y=A\tan 2(r_{21}, r_{11})$ and $\Theta=\{\theta_1, \theta_2, \theta_3, \theta_4, \theta_5, \theta_6\}$ $\Phi=\{a_2, a_3, a_6, d_1, d_3, d_4\}$ System Error Analysis Model:

The analytical error model of the shadow system with the worst case can then be established as follows:

$$\Delta Y \approx \frac{\partial F}{\partial \Phi} \Delta\Phi + \frac{\partial F}{\partial \Theta} \Delta\Theta$$

which leads to $$\begin{pmatrix} \Delta P_X \\ \Delta P_Y \\ \Delta P_Z \\ \Delta\theta_R \\ \Delta\theta_P \\ \Delta\theta_Y \end{pmatrix} = \begin{pmatrix} P_X \\ P_Y \\ P_Z \\ \theta_R \\ \theta_P \\ \theta_Y \end{pmatrix} \begin{pmatrix} \partial/\partial\theta_1 & \partial/\partial\theta_2 & \partial/\partial\theta_3 & \partial/\partial\theta_4 & \partial/\partial\theta_5 & \partial/\partial\theta_6 \\ \partial/\partial a_2 & \partial/\partial a_3 & \partial/\partial a_6 & \partial/\partial d_1 & \partial/\partial d_3 & \partial/\partial d_4 \end{pmatrix}_{nom} \begin{pmatrix} \Delta\theta_1 \\ \Delta\theta_2 \\ \Delta\theta_3 \\ \Delta\theta_4 \\ \Delta\theta_5 \\ \Delta\theta_6 \\ \Delta a_2 \\ \Delta a_3 \\ \Delta a_6 \\ \Delta d_1 \\ \Delta d_3 \\ \Delta d_4 \end{pmatrix}$$

Here, $\Delta\theta_1$, $\Delta\theta_2$, $\Delta\theta_3$, $\Delta\theta_4$, $\Delta\theta_5$, and $\Delta\theta_6$ are the angular displacement errors of the shadow system in joint space, and $\Delta a_2$, $\Delta a_3$, $\Delta a_6$, $\Delta d_1$, $\Delta d_3$, and $\Delta d_4$ are the structural parameter measurements errors of the shadow system in the D-H parameter space. The linear dimensional errors, the angular displacement errors, and the absolute linear dimensional error of the frame origin can then be obtained:

$\Delta D=\pm\{\Delta P_X, \Delta P_Y, \Delta P_Z\}$ $\Delta\Theta=\pm\{\Delta\theta_R, \Delta\theta_P, \Delta\theta_Y\}$ $|\Delta D|=\sqrt{\Delta P_X^2+\Delta P_Y^2+\Delta P_Z^2}$ Determine the Ranges of Measured Positioning Errors To determine the ranges of measured positioning errors, the following simulation is designed with the change of each of joints of the shadow robotic measurement system. If the embodiment of the invention is with the case of the high expectation of positioning accuracy, the joint measurement accuracy is yielding the resolution of the mated 4,608,000 counts/revolution optical rotary encoder, which is ±0.28 arc-second. The D-H dimensional parameters can be determined by using a linear optical encoder with measurement error of ±1 nm. By using the above analytic model of positioning error, the positioning error can be determined with the nominal joint displacements, joint angular measurement errors, and calibration errors of dimensional parameter. In this case, the arrangements and values of the simulation are given below, which lead to $$\Theta|_{nom=\{\Delta\theta_1, \Delta\theta_2, \Delta\theta_3, \Delta\theta_4, \Delta\theta_5, \Delta\theta_6\}}|_{nom}=\{\theta_{1nom}, \theta_{2nom}, \theta_{3nom}, \theta_{4nom}, \theta_{5nom}, \theta_{6nom}\}$$

$$\Phi|_{nom}=\{a_2, a_3, a_6, d_1, d_3, d_4\}=\{1, 0.02, 0.2, 1, 0.15, 0.6\}(m)$$

$$\Delta\Theta=\{\Delta\theta_1, \Delta\theta_2, \Delta\theta_3, \Delta\theta_4, \Delta\theta_5, \Delta\theta_6\}=\pm\{0.28, 0.28, 0.28, 0.28, 0.28, 0.28\}(\text{arc-second})$$

$$\Delta\Phi=\{\Delta a_2, \Delta a_3, \Delta a_6, \Delta d_1, \Delta d_3, \Delta d_4\}=\pm\{1, 1, 1, 1, 1, 1\}(\mu m)$$

To determine the range of measured positioning errors with the change of each of the joints, the algorithm of the simulation processes can be designed as follows:

Simulation Input Designation

Let $\theta_{i\,nom}=(0°, 10°, 20°, \ldots, 1080°)$, and fix the other $\theta_j$ at a random position in the robot joint space; here, $\theta_{j\,nom}\in[0, 360°]$ and $(i=(1,2,3,4,5,6)\|j=(1,2,3,4,5,6)\|j\neq i)$ Obtain the final results of positioning errors with this case $$\Delta D=\{\Delta P_X, \Delta P_Y, \Delta P_Z\}$$

$$\Delta\Theta=\{\Delta\theta_R, \Delta\theta_P, \Delta\theta_Y\}$$

$$|\Delta D|=\sqrt{\Delta P_X^2+\Delta P_Y^2+\Delta P_Z^2}$$

Here, $$\Delta P_X = [\partial P_X/\partial\theta_1\Delta\theta_1 + \partial P_X/\partial\theta_2\Delta\theta_2 + \partial P_X/\partial\theta_3\Delta\theta_3 + \partial P_X/\partial\theta_4\Delta\theta_4 + \partial P_X/\partial\theta_5\Delta\theta_5 + \partial P_X/\partial\theta_6\Delta\theta_6 + \partial P_X/\partial a_2\Delta a_2 + \partial P_X/\partial a_3\Delta a_3 + \partial P_X/\partial a_6\Delta a_6 + \partial P_X/\partial d_3\Delta d_3 + \partial P_X/\partial d_4\Delta d_4]_{nom}$$

$$\Delta P_Y = [\partial P_Y/\partial\theta_1\Delta\theta_1 + \partial P_Y/\partial\theta_2\Delta\theta_2 + \partial P_Y/\partial\theta_3\Delta\theta_3 + \partial P_Y/\partial\theta_4\Delta\theta_4 + \partial P_Y/\partial\theta_5\Delta\theta_5 + \partial P_Y/\partial\theta_6\Delta\theta_6 + \partial P_Y/\partial a_2\Delta a_2 + \partial P_Y/\partial a_3\Delta a_3 + \partial P_Y/\partial a_6\Delta a_6 + \partial P_Y/\partial d_1\Delta d_1 + \partial P_Y/\partial d_3\Delta d_3 + \partial P_Y/\partial d_4\Delta d_4]_{nom}$$

$$\Delta P_Z = [\partial P_Z/\partial\theta_1\Delta\theta_1 + \partial P_Z/\partial\theta_2\Delta\theta_2 + \partial P_Z/\partial\theta_3\Delta\theta_3 + \partial P_Z/\partial\theta_4\Delta\theta_4 + \partial P_Z/\partial\theta_5\Delta\theta_5 + \partial P_Z/\partial\theta_6\Delta\theta_6 + \partial P_Z/\partial a_2\Delta a_2 + \partial P_Z/\partial a_3\Delta a_3 + \partial P_Z/\partial a_6\Delta a_6 + \partial P_Z/\partial d_1\Delta d_1 + \partial P_Z/\partial d_3\Delta d_3 + \partial P_Z/\partial d_4\Delta d_4]_{nom}$$

$$\Delta\theta_R = [\partial\theta_R/\partial\theta_1\Delta\theta_1 + \partial\theta_R/\partial\theta_2\Delta\theta_2 + \partial\theta_R/\partial\theta_3\Delta\theta_3 + \partial\theta_R/\partial\theta_4\Delta\theta_4 + \partial P_Z/\partial\theta_5\Delta\theta_5 + \partial P_Z/\partial\theta_6\Delta\theta_6 + \partial\theta_R/\partial a_2\Delta a_2 + \partial\theta_R/\partial a_3\Delta a_3 + \partial\theta_R/\partial a_6\Delta a_6 + \partial\theta_R/\partial d_1\Delta d_1 + \partial\theta_R/\partial d_3\Delta d_3 + \partial\theta_R/\partial d_4\Delta d_4]_{nom}$$

$$\Delta\theta_P = [\partial\theta_P/\partial\theta_1\Delta\theta_1 + \partial\theta_P/\partial\theta_2\Delta\theta_2 + \partial\theta_P/\partial\theta_3\Delta\theta_3 + \partial\theta_P/\partial\theta_4\Delta\theta_4 + \partial\theta_P/\partial\theta_5\Delta\theta_5 + \partial\theta_P/\partial\theta_6\Delta\theta_6 + \partial\theta_P/\partial a_2\Delta a_2 + \partial\theta_P/\partial a_3\Delta a_3 + \partial\theta_P/\partial a_6\Delta a_6 + \partial\theta_P/\partial d_1\Delta d_1 + \partial\theta_P/\partial d_3\Delta d_3 + \partial\theta_P/\partial d_4\Delta d_4]_{nom}$$

-continued $$\Delta\theta_Y = [\partial\theta_Y/\partial\theta_1\Delta\theta_1 + \partial\theta_Y/\partial\theta_2\Delta\theta_2 + \partial\theta_Y/\partial\theta_3\Delta\theta_3 + \partial\theta_Y/\partial\theta_4\Delta\theta_4 + \partial\theta_Y/\partial\theta_5\Delta\theta_5 + \partial\theta_Y/\partial\theta_6\Delta\theta_6 + \partial\theta_Y/\partial a_2\Delta a_2 + \partial\theta_Y/\partial a_3\Delta a_3 + \partial\theta_Y/\partial a_6\Delta a_6 + \partial\theta_Y/\partial d_1\Delta d_1 + \partial\theta_Y/\partial d_3\Delta d_3 + \partial\theta_Y/\partial d_4\Delta d_4]_{nom}$$

The above solution is only true when $|\cos\theta_P|>0$. If $|\cos\theta_P|=0$, the solution will degenerate. In such cases, only the sum or the difference of $\theta_R$ and $\theta_Y$ can be computed.

Draw Curves of Simulated Positioning Errors

The corresponding positioning errors with the shadow robotic measurement system built with the 4,608,000 resolution rotary encoder can then be described through FIG. 6 to FIG. 11.

The simulations show that within most of its working envelope the measured positioning errors with the Puma 560 shadow system is smaller than the rounded goal of low expectation for the development of a multiple DOF ultra-precision robotic system which is $$\text{ERR}_{Absolute}32\ \{10\ \mu m,\ 2.5\ \text{arc-second}\}$$

With the highly correlated Puma 560 working domain, the simulation results also show that there are still lots of space to realize the expected goals.

Although the results of error analysis are conducted by the use of a common optical rotary encoder on the market, such results have already conducted the breakthrough for the development of a multiple DOF ultra-precision robotic system. As above-mentioned, if the specialized ultra-precision optical rotary encoder can be adopted, then much higher ultra-precision positioning accuracy for either rigid body robotic system or a LDRS can be achieved. As above-mentioned, when the 32 bit resolution optical encoder is used, the positioning accuracy can achieve the nm level with this invention. As known, to date, the robotics technology is still in its developing stage for pursuing the positioning accuracy in micro-accuracy level. In this situation, the advantages of the technology of ultra-precision robotic system developed with this research are obvious.

Having presented my invention, I claim:

1. A multiple degree-of-freedom (DOF) ultra-precision shadow robotic measurement system consists of linkages, kinematic joints, and sensors that are mated with the said kinematic joints to form a passive servo-measurement system to monitor the position of an object with its own end-effecter through a connection-point, within which the said position includes the frame origin position and frame orientation of the object, and the said multiple DOF means that the DOF is larger or equal to any combination of 3-DOF associated with the X, Y, Z, Pitch, Roll, and Yaw directions in the 6-DOF robotic working domain.

2. The said multiple DOF ultra-precision shadow robotic measurement system according to claim 1 wherein the said kinematic joints can be either revolute joints or prismatic joints.

3. The said kinematic joints according to claim 2 wherein the said revolute joints are mated with proper rotary measurement sensors to monitor and to record the angular displacement of the said revolute joints.

4. The said kinematic joints according to claim 2 wherein the said prismatic joints are mated with proper linear measurement sensors to monitor and to record the linear displacement of the said prismatic joints.

5. A multiple degree-of-freedom (DOF) ultra-precision robotic system comprises a multiple DOF ultra-precision shadow robotic measurement system and a multiple DOF robot, within which the said multiple DOF means that the DOF is larger or equal to any combination of 3-DOF associated with the X, Y, Z, Pitch, Roll, and Yaw directions in 6-DOF robotic working domain; whereby the said multiple DOF shadow robotic measurement system and said multiple DOF robot is integrated to form a closed-loop linkage chain to establish a corresponding closed-loop feedback control of the said robotic system.

6. The multiple DOF ultra-precision robotic system according to claim 5 wherein said closed-loop control is established associated with the said closed-loop linkage chain of the robotic system, which detects the position error between the real-time position and the designated ideal position of the end-effecter of said multiple DOF robot in a working process with the said multiple DOF ultra-precision shadow robotic measurement system, and then corrects the measured positioning error of the end-effecter of said multiple DOF robot step by step to approach the designated ideal position of said robotic system with ultra-precision positioning accuracy without the use of any target or artificial marker in the work-cell as the reference, within which the said position includes the frame origin position and frame orientation of the end-effecter corresponding to the X, Y, Z, Pitch, Roll, and Yaw directions in the 6-DOF robotic working domain.

7. The multiple DOF ultra-precision robotic system according to claim 5 wherein the said multiple DOF robot is either a multiple DOF robot under rigid body guidance or a multiple DOF robot with large deformation analysis (LDRS, i.e. a semi-flexible or a flexible robot).

* * * * *